June 27, 1939. A. R. THOMAS 2,163,815
REFRIGERATION
Filed Oct. 15, 1936 3 Sheets-Sheet 1

INVENTOR.
Albert R. Thomas
BY
E. A. Fenander
his ATTORNEY.

June 27, 1939.    A. R. THOMAS    2,163,815
REFRIGERATION
Filed Oct. 15, 1936    3 Sheets-Sheet 2

INVENTOR.
Albert R. Thomas
BY Ed Fenander
his ATTORNEY.

June 27, 1939.  A. R. THOMAS  2,163,815
REFRIGERATION
Filed Oct. 15, 1936   3 Sheets-Sheet 3

INVENTOR.
Albert R. Thomas
BY
his ATTORNEY.

Patented June 27, 1939

2,163,815

UNITED STATES PATENT OFFICE 2,163,815

REFRIGERATION

Albert R. Thomas, Evansville, Ind., assignor to Servel, Inc., New York, N. Y., a corporation of Delaware Application October 15, 1936, Serial No. 105,682

9 Claims. (Cl. 62—119.5)

My invention relates to refrigeration, and more particularly to refrigeration apparatus of the absorption type.

It is an object of my invention to provide an improved air-cooled absorber for refrigeration apparatus of the absorption type in which the flow of gas in the absorber is counter-current to the flow of air caused to circulate past the absorber.

Another object of my invention is to provide refrigeration apparatus of the absorption type which is so constructed and arranged in a refrigerator cabinet that air is caused to circulate naturally past the absorber in a direction opposite to the flow of vaporous refrigerant in the absorber.

A further object of my invention is to provide an improved air-cooled absorber for absorption refrigeration apparatus of the type containing an inert gas, whereby the inert gas flows from a higher temperature point to a lower temperature point in the path of air flow.

Figure 1:
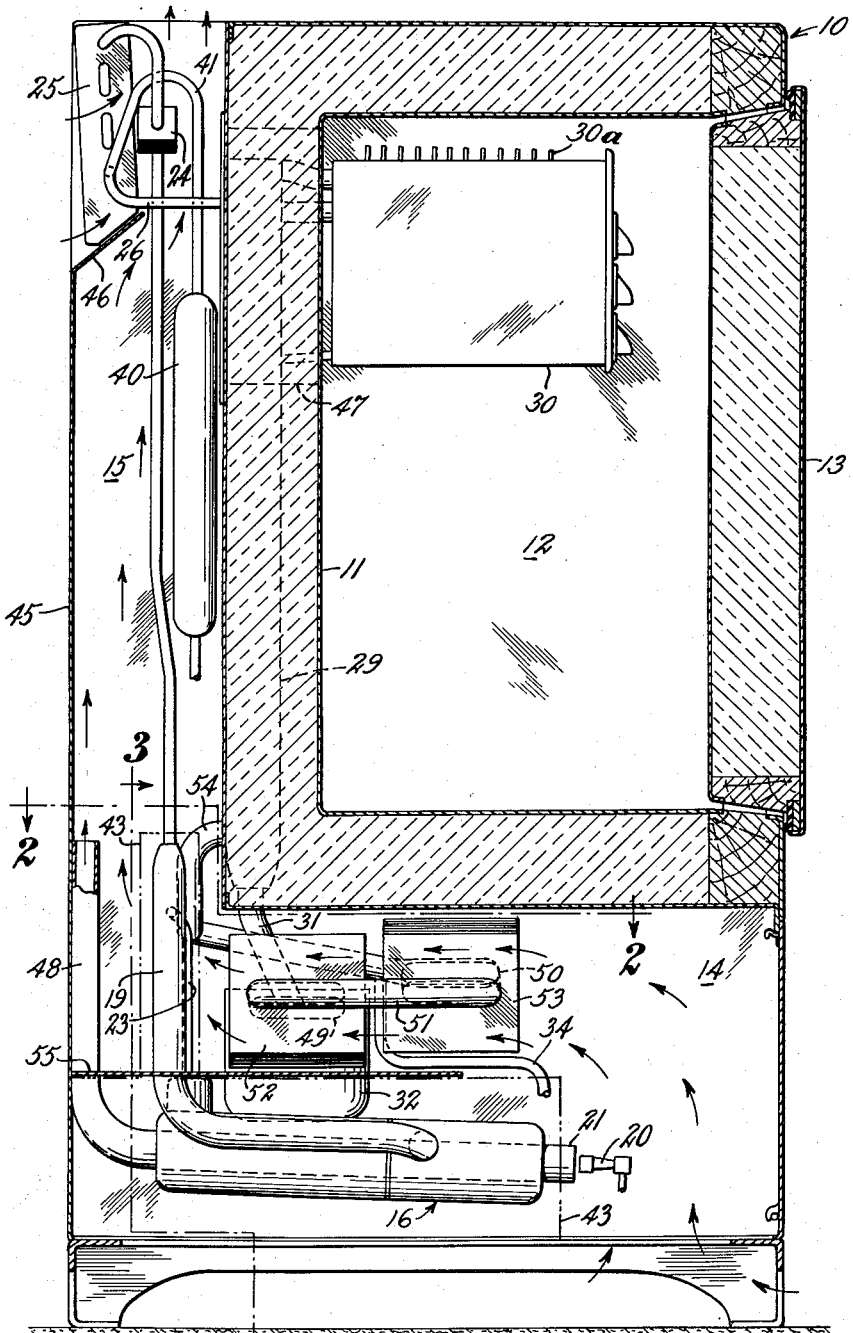
Figure 2:
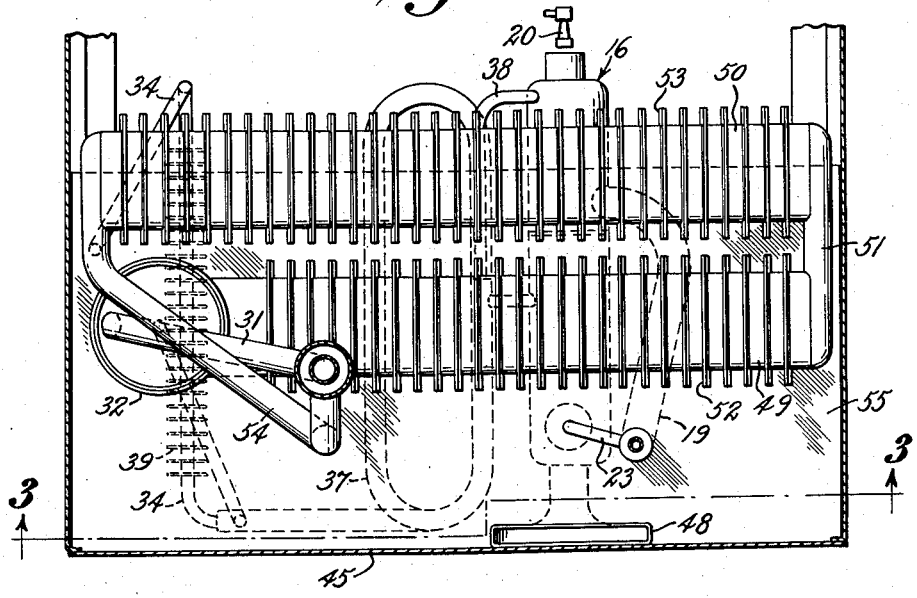
Figure 3:
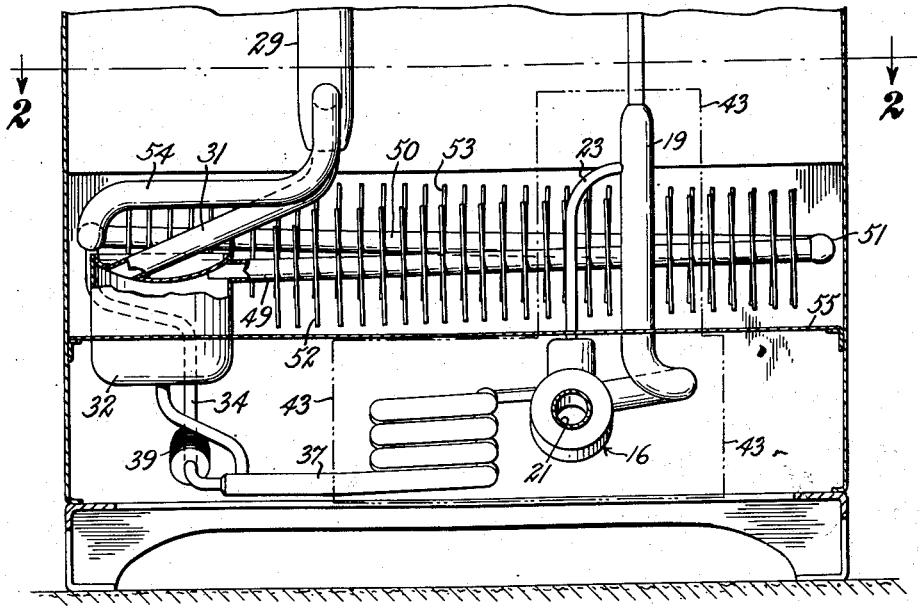
Figure 4:
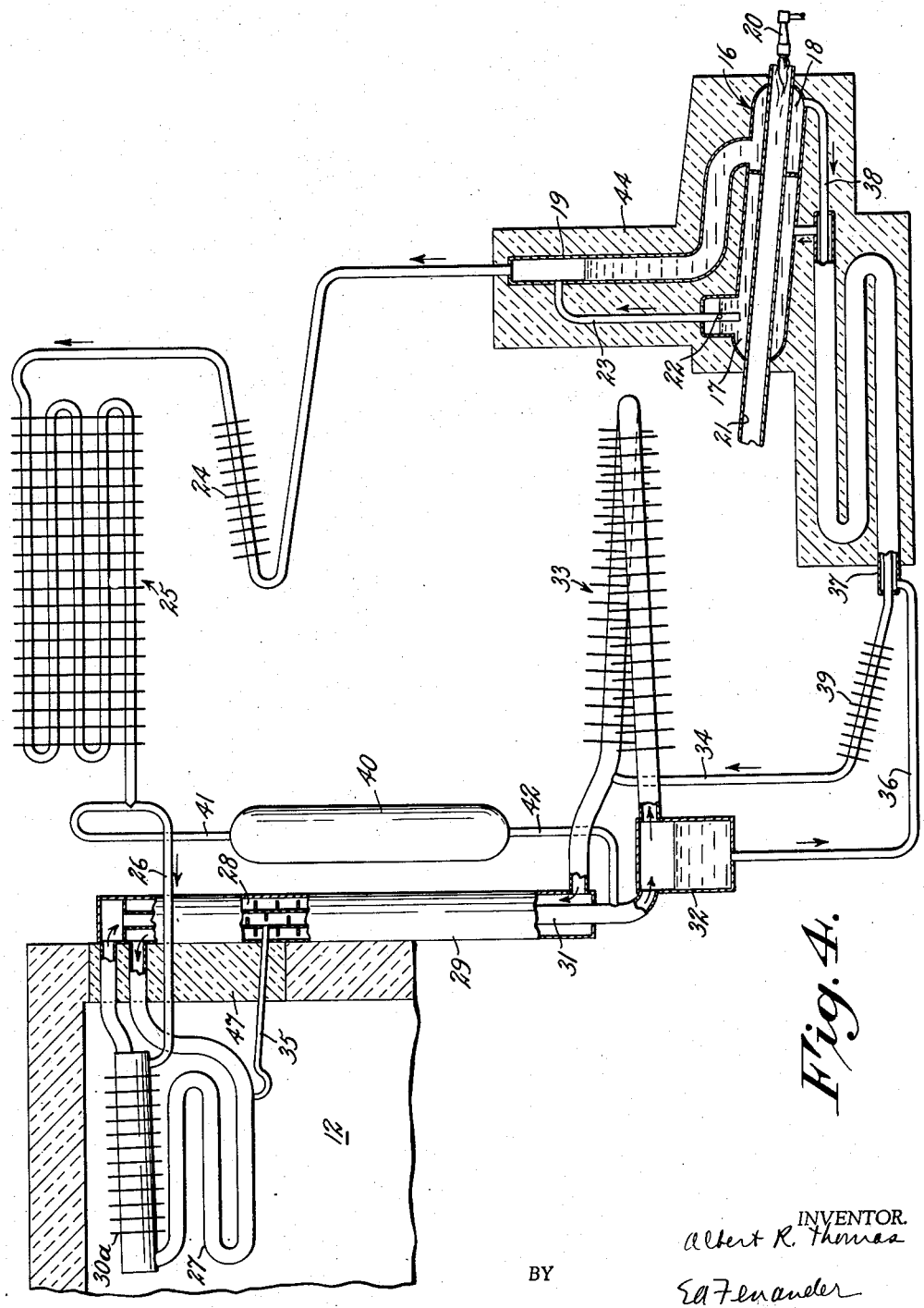

The novel features which I believe to be characteristic of my invention are set forth with particularity in the claims. The invention, both as to organization and method, together with further objects and advantages thereof, will be better understood by reference to the following description taken in connection with the accompanying drawings of which Fig. 1 is a side elevation, partly in section, of a refrigerator embodying my invention; Fig. 2 is a sectional view taken on lines 2—2 of Figs. 1 and 3; Fig. 3 is a sectional view taken on lines 3—3 of Figs. 1 and 2; and Fig. 4 diagrammatically illustrates more fully refrigeration apparatus of which parts are shown in Figs. 1, 2, and 3.

Referring to Fig. 1, I have shown my invention embodied in a refrigerator including a cabinet 10 having thermally insulated walls 11 defining a storage space 12 into which access may be had by a door 13 hinged to the front of the cabinet. Below the storage space 12 is an apparatus compartment 14 which extends to the rear of the cabinet 10 and communicates with an upward extending compartment or flue 15 which also houses parts of the refrigeration apparatus.

The refrigeration apparatus shown is of a uniform pressure absorption type, generally as described in Patent No. 1,609,334 to B. C. von Platen and C. G. Munters. Referring to Fig. 4, the refrigeration apparatus comprises a generator 16 having a rear chamber 17 and a forward chamber 18 communicating with an upward extending stand-pipe or separator 19. The generator contains a body of absorption liquid having a suitable refrigerant in solution therein, and, although I do not wish to be limited thereto, the absorption liquid and refrigerant may be water and ammonia, respectively. The generator 16 may be heated in any suitable manner, as by a burner 20, which projects its flame into the forward end of a horizontal flue 21 which extends through the generator. The heat applied to the generator causes ammonia vapor and absorption liquid in chamber 17 to pass through an opening 22 in the lower end of a small vertical conduit 23 which constitutes a vapor-lift and conducts ammonia vapor and absorption liquid to the upper part of the stand-pipe 19. The liberated ammonia vapor entering the stand-pipe 19 from conduit 23, as well as the ammonia vapor expelled from solution in the stand-pipe 19 and chamber 18, flows upward through an air-cooled rectifier 24 which condenses water vapor accompanying the ammonia vapor. The water condensed in the rectifier drains back to the generator, and the ammonia vapor flows upward to an air-cooled condenser 25 comprising a coil provided with a plurality of heat dissipating elements or cooling fins. The ammonia is liquefied in the condenser 25 by surrounding cooler air which flows over the surfaces of the coil and fins, and the liquefied ammonia flows through a conduit 26 into the upper section of an evaporator coil 27 which is below the condenser and arranged within the storage space 12.

An inert gas, such as hydrogen, enters the lower section of the evaporator coil 27 from the outer passage 28 of a gas heat exchanger 29. The liquid ammonia evaporates and diffuses into the hydrogen with consequent absorption of heat from the surroundings of the evaporator. The lower section of the evaporator coil 27 may be arranged closely adjacent to and in heat exchange relation with a shell 30 which is adapted to receive trays for freezing water, as shown in Fig. 1, and the upper section of the evaporator coil may be provided with a plurality of fins 30a. The resulting mixture of ammonia and hydrogen, that is, gas rich in ammonia, flows downward from the evaporator coil 27 through the inner passage or conduit 31 of the gas heat exchanger 29 which is connected at its lower end to the upper part of a vessel 32. The gas rich in ammonia flows from vessel 32 into the lower end of an air-cooled absorber 33 in which the ammonia is absorbed into weak absorption liquid that enters the upper part of the absorber through a vertically extending conduit 34. The hydrogen, which is practically insoluble and weak in ammonia, passes upward from the absorber 33 through the outer passage 28 of the gas heat exchanger 29 into the evaporator coil 27. The gas heat exchanger 29 transfers heat from gas which is weak in ammonia and flowing toward the evaporator coil to gas which is rich in ammonia and flowing toward the absorber 33. A conduit 35 is connected to the lower part of the evaporator coil 27 and to conduit 31 to drain liquid ammonia from the lower section of the evaporator coil 27.

The absorption liquid flowing downward through the absorber 33 in counter-flow to the gas mixture and in intimate contact with the latter becomes enriched in ammonia and flows into the vessel 32 which serves as an accumulation vessel for the absorption liquid. From the vessel 32 the absorption liquid passes through conduit 36 and outer passage 37 of a liquid heat exchanger to chamber 17 of the generator. Liberted ammonia vapor and absorption liquid are caused to flow upward through the vertical conduit 23 into the upper part of the stand-pipe 19, as explained above, to a higher level than it is in the absorber 33; and the absorption liquid weak in ammonia flows from chamber 18 through the inner passage 38 of the liquid heat exchanger and conduit 34 into the upper end of the absorber 33. A portion of the conduit 34 is provided with a plurality of fins 39 to effect additional cooling of the weak absorption liquid entering the absorber 33.

In order to vary the total pressure in the refrigeration system just described with changes in air temperature, a vessel 40 for storing hydrogen is provided having the upper part thereof connected by conduit 41 to the lower end of the condenser 25 and the lower part thereof connected by conduit 42 to the gas circuit. The vessel 40 and conduits 41 and 42 provide a path of flow from the condenser 25 to the gas circuit, so that any hydrogen which passes through the condenser can flow to the gas circuit and not be trapped in a condenser. Further, should the air temperature increase so that ammonia is not liquefied in the condenser, the ammonia vapor will flow through conduit 41 to displace hydrogen in the vessel 40 and force hydrogen through conduit 42 into the gas circuit. This raises the total pressure in the system so that an adequate condensing pressure is obtained for the increased air temperature.

The manner in which the refrigeration apparatus just described is arranged in the apparatus compartments 14 and 15 below and to the rear of the storage space 12 is clearly shown in Figs. 1, 2, and 3, with similar parts designated by the same reference numerals. The different elements or parts and connecting conduits are made of metal and permanently secured together, as by welding, for example, to provide a hermetically closed system. The generator 16, liquid heat exchanger, and stand-pipe 19 are preferably enclosed in a shell, indicated by a dotted line 43 in Figs. 1 and 3, which contains a body 44 of suitable insulating material, as shown diagrammatically in Fig. 4.

The shell 43 is arranged in the lower part of the apparatus compartment 14 with the upright portion thereof extending upward into the lower part of the rear apparatus compartment 15. The pressure vessel 40 is disposed in the rear apparatus compartment, and above the latter are positioned the air-cooled rectifier 24 and air-cooled condenser 25. The rear wall 45 of the refrigerator terminates at the lower end of the condenser 25 and deflects inwardly, as indicated at 46.

Adjacent to the condenser 25 the rear wall of the storage compartment is provided with an opening having a removable wall part or cover 47 whereby the evaporator coil 27 can readily be placed in position within the storage space when the cover 47 is fitted into the opening. The gas heat exchanger 29 is disposed in the rear insulated wall of the storage space 12.

The flue 21 of the generator 16 is bent adjacent to the rear wall 45 of the refrigerator and extends upward into the lower part of the rear apparatus compartment 15. The vertical portion 48 of the flue 21 serves as an off-take duct for the products of combustion of the burner flame and is flared outward with the upper discharge end thereof substantially rectangular in section, as shown in Fig. 2.

During operation of the refrigeration apparatus, the temperature of the air in the rear apparatus compartment 15 is considerably higher than that of the air surrounding the refrigerator, due to the hot products of combustion of the burner flame discharged from the off-take duct 48. This produces a natural draft in the apparatus compartment 15 and causes an upward circulation of air in the manner indicated by the arrows of Fig. 1. The upward circulation of air is also partly caused by the heat radiated by the air-cooled rectifier 24 and air-cooled condenser 25 which are preferably positioned adjacent the outlet of the air flue and above the rear wall 45, so that surrounding cooler air can flow directly over their surfaces and assure adequate cooling of these parts of the refrigeration apparatus.

The continuous circulation of hydrogen in the gas circuit including the evaporator coil 27 and absorber 33 is due to the difference in specific weight of the rich mixture of hydrogen and vaporous refrigerant in the evaporator coil 27 and conduit 31 and the weak mixture of these gases in the absorber 33 and passage 28. The more effectively vaporous refrigerant is absorbed into absorption liquid in the absorber, therefore, the greater will be the difference in specific weight of the gases flowing toward the absorber 33 and toward the evaporator 27 in the gas circuit.

In accordance with my invention I provide an air-cooled absorber 33 which is so constructed and arranged that the gases circulated therethrough are in counter-flow to the air passing over the surfaces of the absorber, so that the latter will operate efficiently to absorb vaporous refrigerant into absorption liquid. The absorber 33 comprises two inclined conduits 49 and 50 arranged alongside each other, the conduits being relatively wide compared to their height and substantially rectangular in section to provide a relatively large heat transfer surface. The upper end of conduit 49 is connected by means of a cross conduit 51 to the lower end of conduit 50, as shown most clearly in Fig. 2, the conduits in effect forming a single conduit including straight portions and a bend to provide a vessel having an inlet and outlet at different elevations. A plurality of heat dissipating elements or cooling fins are secured to the conduits with the group or bank of parallel fins 52 secured to the conduit 49 inclined and out of alignment with the group of parallel fins 53 secured to the conduit 50.

The absorber 33 is substantially horizontal and arranged in the lower apparatus compartment 14 in the space between the bottom thermally insulated wall of the storage compartment 12 and the top horizontal portion of the shell 43.

The uppermost conduit 50 of the absorber is positioned at the forward end of the lower apparatus compartment and to the upper end thereof is connected the vertical conduit 34 through which weak absorption liquid flowing from the generator 16 enters into the absorber, as shown in Fig. 3. To the upper end of conduit 50 is also connected a conduit 54 which is connected at its upper end to the lower end of the outer passage 28 of the gas heat exchanger 29, as shown in Figs. 2 and 3, through which conduit 54 passes gas flowing from the absorber to the evaporator coil 27. The lower end of conduit 49, which is positioned to the rear of conduit 50, is directly connected to the upper part of the vessel 32 which differs in Fig. 3 from the vessel 32 diagrammatically illustrated in Fig. 4 in that the top of the vessel is shown concave-shaped with the lower end of the inner conduit 31 of the gas heat exchanger 29 connected to the top of the vessel rather than to the side of the vessel.

It will now be understood, in view of the description of the apparatus given above in connection with Fig. 4, that weak absorption liquid is introduced into the upper end of the forward conduit 50 and flows downward therein and through the cross conduit 51 and rear conduit 49 into the storage vessel 32. The gas mixture which is rich in ammonia, on the other hand, flows from the vessel 32 through the rear conduit 49, cross conduit 51, and forward conduit 50 from which it passes through conduit 54 into the outer passage 28 of the gas heat exchanger 29. The gas mixture in the absorber, therefore, first flows through the rear conduit 49 and then through the forward conduit 50 of the absorber in a direction counter-current to the substantially horizontal flow of air in the lower apparatus compartment 14, as shown in Fig. 1. A baffle plate 55, which extends between the side walls of the refrigerator and from the rear wall 45 to the forward part of the absorber 33, is positioned directly beneath the absorber. In this manner a passageway is provided for the absorber 33 whereby all of the air caused to flow upward in the rear apparatus compartment or flue 15, as explained above, must first pass over the surfaces of the conduits 49 and 50 and fins 52 and 53 secured thereto, as indicated by the arrows in Fig. 1. The air passing over the heat transfer surfaces of the absorber 33 adjacent the inlet of the air flue is heated and further augments the heating of air effected in the rear apparatus compartment 15 to cause an upward circulation of air which is extremely effective to withdraw heat rejected from the different parts of the apparatus which are arranged to be air-cooled.

By providing two groups or banks of fins on the absorber 33 which are out of alignment and inclined with respect to each other, the path of travel of the air is changed whereby a twisting or stirring of air is effected to insure good heat transfer from the heat dissipating surfaces provided by the absorber. With the circulation of the gas mixture in the absorber in counter-flow to the circulation of air past the absorber, an extremely efficient absorber is provided in which the vaporous refrigerant is effectively absorbed into the absorption liquid, thereby improving the efficiency of the refrigeration apparatus. Further, by positioning the absorber in a passageway formed in the lower apparatus compartment 14 in the manner shown and described, the circulation of air caused by the discharge of the products of combustion of the burner flame and the rejection of heat by other parts of the apparatus, as well as the absorber, is effectively utilized to insure a relatively large quantity of air passing over the absorber.

Although I have shown and described a preferred embodiment of my invention, I do not wish to be limited to the particular arrangement set forth, and I intend in the following claims to cover all modifications which do not depart from the spirit and scope of my invention.

What is claimed is:

1. Refrigeration apparatus comprising structure forming a vessel provided with a relatively large heat transfer surface, conduit means for introducing a gas including vaporous refrigerant and absorption liquid into said vessel, means adjacent to said structure forming a laterally extending passageway for air, means for causing air to flow through said passageway, said structure and conduit means being so constructed and arranged to provide lateral flow of gas in said vessel and from a point of higher air temperature to a point of lower air temperature in the path of flow of air past said structure.

2. Refrigeration apparatus comprising a conduit including straight portions and a bend and having an inlet and outlet at different elevations, members for introducing gas and liquid into said conduit, a plurality of heat dissipating elements secured to the straight portions of said conduit, said conduit being arranged with the inlet and outlet in slightly different vertical planes whereby gas and liquid flowing therethrough are conducted in a substantially horizontal direction, and means for causing air to flow substantially horizontally past said conduit and said elements secured thereto in a direction such that the gas in said conduit flows from a point of higher air temperature to a point of lower air temperature.

3. Refrigeration apparatus comprising a conduit including straight portions and a bend and having an inlet and outlet at different elevations, members for introducing gas and liquid into said conduit, a plurality of heat dissipating elements secured to the straight portions of said conduit, said conduit being so formed and arranged that the straight portions thereof are disposed alongside each other in substantially a horizontal plane whereby gas and liquid flowing therethrough are conducted in a substantially horizontal direction, and means for causing air to flow substantially horizontally past said conduit and said elements secured thereto and in a direction such that the gas in said conduit flows from a point of higher air temperature to a point of lower air temperature.

4. A refrigerator comprising a cabinet provided with a thermally insulated storage space, a vertically extending air flue disposed adjacent to said storage space and having an inlet below said storage space and an outlet above the inlet, an absorber arranged at the inlet of said flue and comprising a conduit including straight portions and a bend and having an inlet and outlet at different elevations, members for introducing gas and liquid into said conduit, a plurality of cooling fins secured to the straight portions of said conduits, said conduit being so formed and arranged that the straight portions are substantially in a horizontal plane whereby gas and liquid flowing therethrough are conducted in a substantially horizontal direction, and means including said absorber for causing air to flow substantially horizontally past said conduit in a direction such that the gas in the conduit is first in one straight portion in heat transfer relation with air which has been warmed by dissipation of heat from another straight portion and then in such other straight portion in heat transfer relation with cooler air, said cooling fins forming a plurality of passageways extending substantially in the direction of air flow.

5. In an absorption refrigeration system, members forming a natural draft flue having a lateral section and a vertical section behind the lateral section in the path of travel of air in the flue, an absorber having a first tubular branch in said lateral flue section and a second tubular branch in said lateral flue section behind the first tubular branch in the path of air flow and connected thereto in series, an evaporator, means to conduct a gaseous medium including an inert gas from said evaporator to said second tubular branch and from said first tubular branch to said evaporator, a generator, means to conduct weak absorption liquid from said generator to said first tubular branch, and means to conduct strong absorption liquid from said second tubular branch to said generator, whereby inert gas flows from a higher temperature point to a lower temperature point in the air flue.

6. In an absorption refrigeration system, members forming a laterally extending air passage, means to cause flow of air in said passage in a given direction, an absorber having a first tubular branch in said passage and a second tubular branch in said passage behind the first tubular branch in the path of air flow, said branches being connected in series, an evaporator, means to conduct a gaseous medium including an inert gas from said evaporator to said second tubular branch and from said first tubular branch to said evaporator, a generator, means to conduct weak absorption liquid from said generator to said first tubular branch, and means to conduct strong absorption liquid from said second tubular branch to said generator, whereby inert gas flows from a higher temperature point to a lower temperature point in the air flue.

7. In an absorption refrigeration system, an absorber including a plurality of tubular branches disposed substantially side by side and laterally of each other and having a generally downward slope for gravity flow of absorption liquid, one branch having an average elevation higher than another branch, means to cause flow of inert gas and refrigerant vapor from a lower branch to a higher branch, and means to cause cooling air to flow in contact with said branches and to direct said air so that the major part of unheated air contacts the branch of higher elevation.

8. In an absorption refrigeration system, an absorber including a plurality of tubular branches disposed substantially side by side and laterally of each other and having a generally downward slope for gravity flow of absorption liquid, one branch having an average elevation higher than another branch, means to cause flow of inert gas and refrigerant vapor from a lower branch to a higher branch, and means to cause cooling air to flow in contact with said branches and to direct said air so that all of the air first contacts a branch of higher elevation and thereafter a branch of lower elevation.

9. Apparatus as set forth in claim 6 in which the tubular branches are provided with separate groups of fins arranged in series with respect to air flow.

ALBERT R. THOMAS.